United States Patent Office 3,281,562
Patented Oct. 25, 1966

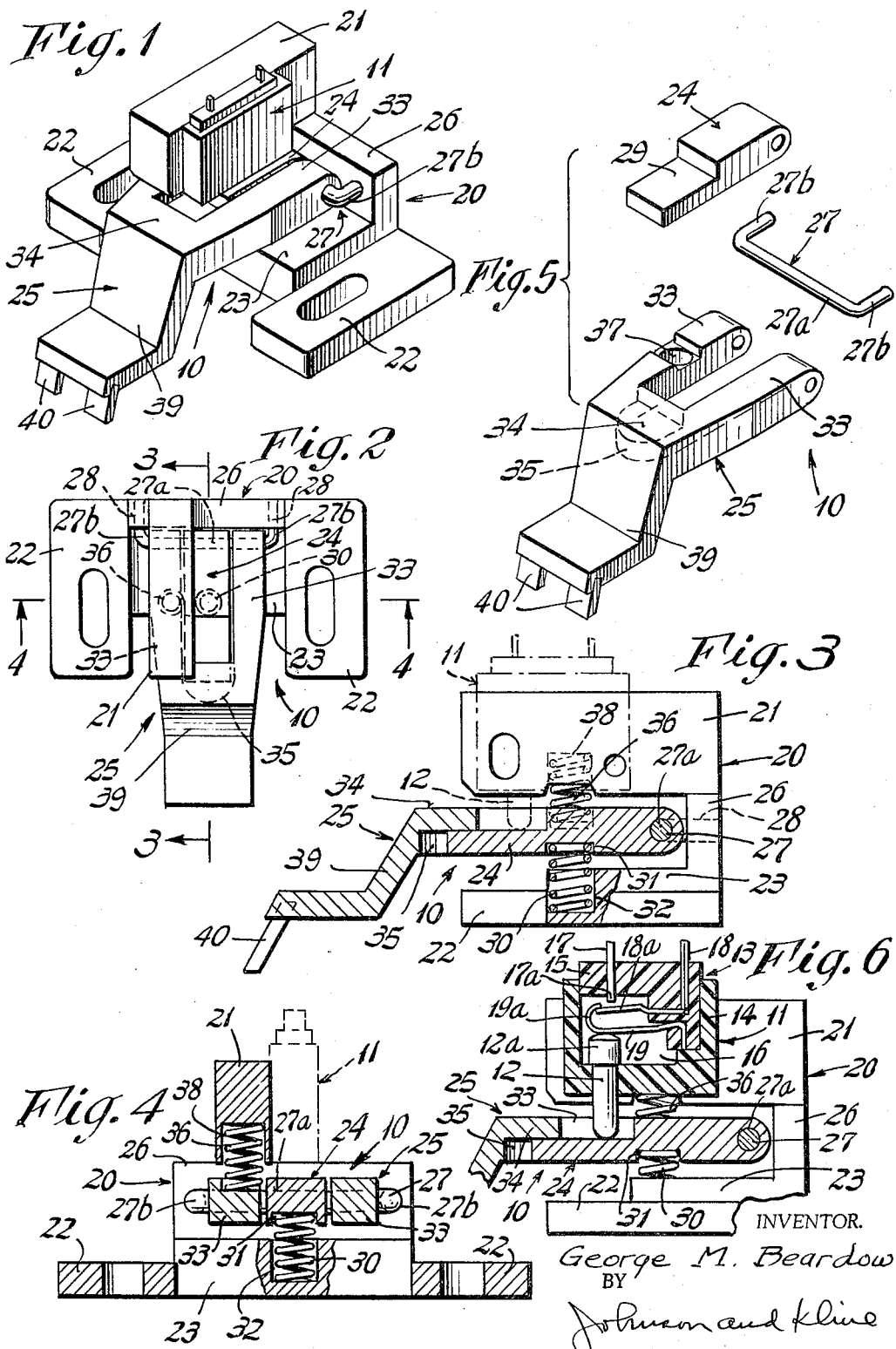

3,281,562
ACTUATOR DEVICE FOR AN INSTRUMENTALITY HAVING A MOVABLE OPERATOR
George M. Beardow, Redding Ridge, Conn., assignor to Vitramon, Incorporated, Monroe, Conn., a corporation of Delaware
Filed Aug. 18, 1964, Ser. No. 390,358
10 Claims. (Cl. 200—153)

This invention relates to an actuator for an instrumentality having an operator movable through a predetermined distance and normally urged to a predetermined position. More specifically, it pertains to an actuator adapted to substantially eliminate the transmission of vibration or shock from the actuator to the operator and thence to the instrumentality.

In certain instrumentalities, such as the electrical switch device disclosed in United States Patent No. 2,993,963, it has been found that, even though the instrumentality has been designed to eliminate or reduce the effect of actuating vibration, where the actuation is unpredictable, as by manual or other irregular control, the ability of the instrumentality to eliminate the effect of vibration is seriously reduced. For example, the switch device above referred to, while designed for bounce free operation when actuated by electrical or mechanical means, has been found to have some bounce or vibration imparted thereto when actuated manually in an abrupt or erratic manner.

The present invention overcomes the foregoing problems relating to actuating devices and has as an important object thereof the provision of an actuator for an instrumentality, which is adapted to be manually or similarly operated while preventing the transmission of vibration to the instrumentality.

The actuator, according to the invention, eliminates the transmission of vibration to the instrumentality through its operator by physically distinguishing between and separating the means for operating the actuator and the means whereby the actuator imparts movement to the operator of the instrumentality. For example, the actuator may comprise a first member normally urged to a position for moving or actuating the operator and a second member, separate from the first member, adapted to releasably engage the first member and being normally urged to a position which prevents the first member from moving the operator, the second member disengaging the first member when moved from its normal position to enable the first member to actuate the operator.

It is, therefore, also an object of the invention to provide an actuator for the operator of an instrumentality, which imparts movement to the operator while physically separating the latter from the sources of actuation that are liable to produce vibration in the instrumentality.

Another object of the invention is to provide an actuator for an instrumentality having an operator movable through a predetermined distance and normally urged to a predetermined position, which includes a first member normally urged to move in a predetermined manner for moving the operator through its predetermined path of travel and a second member releasably engaging the first member and movable in a manner similar to the first member, but normally urged in a direction opposed to the first member by a force sufficient to prevent movement of the latter, the second member having means for moving it against its normal urging so that the first member is enabled to move the operator and is released by the second member when the operator has completed its predetermined travel.

Still another object of the invention is to provide in combination with an electrical switch having a reciprocable operator that is physically separated from the switch contacts in their closed circuit position, an actuator for the operator which relieves the operator of actuating vibration on completion of actuating movement, whereby the switch is not affected by erratic actuator operation.

It is further an object of the invention to provide an actuator, for an instrumentality having an operator movable through a predetermined distance and normally urged to a predetermined position, which accurately imparts the desired movement to the operator, without transmitting vibrations therethrough, is of simple rugged construction, readily assembled and capable of functioning for a long period of time with freedom from all difficulties.

Other objects and advantages of the invention will be apparent from the specification and claims when considered in connection with the attached sheet of drawings, illustrating one form of the invention, wherein like characters represent like parts and in which:

FIGURE 1 is a perspective view of an instrumentality in combination with an actuator according to the invention;

FIG. 2 is a plan view of the combination of FIG. 1;

FIG. 3 is a side elevational view, partially broken away and in section, of the combination of FIG. 1;

FIG. 4 is a front elevational view, partially broken away and in section, of the combination of FIG. 1;

FIG. 5 is an exploded perspective view of an actuator according to the invention; and FIG. 6 is a side elevational view, partially in section, showing in detail the combination of an actuator, according to the invention, with an instrumentality having an operator movable through a predetermined distance and normally urged to a predetermined position.

Referring now to the drawings for a more detailed description of the invention, an actuator 10, embodying the invention, is shown in combination with an instrumentality 11 having an operator 12 movable through a predetermined distance and normally urged to a predetermined position.

While the instrumentality 11 may comprise any device having an operator 12 therefor of the character described, in the herein illustrated form of the invention the instrumentality is shown as an electrical switch of the type disclosed in United States Patent No. 2,993,963, to which reference may be made for specific details of construction and operation. Basically, the switch 11 includes a housing 13 of electrical insulating material, the housing, as shown comprising a frame 14 adapted to receive and house a contact block 15. The frame and contact block, which cooperate to form the housing 13, provide a recess 16 into which the contacts and other switch elements extend, as will be hereinafter described.

The contact block 15, which is adapted to be assembled with the contacts and other switch elements prior to its insertion in the frame 14 mounts a stationary contact member 17 and movable contact member 18, the contact members 17 and 18 including, respectively, contact portions 17a and 18a adapted to extend into the recess 16 when the contact block is inserted in the frame. Conventional lead wires (not shown) may be connected to the contacts 17 and 18 externally of the housing for connecting the switch into a desired circuit.

The movable contact member 18 is normally urged toward the stationary contact member 17 into closed circuit position therewith and, while this may be achieved by various means, in the herein illustrated form it is accomplished by the resilient nature and predetermined set of the movable contact member itself.

The contact block 15, in addition to mounting the contacts 17 and 18, also mounts a contact restraining member 19, which is physically separate from the contact members and is positioned adjacent the movable contact member on the side thereof directed away from the stationary contact member. The contact restraining member, which is formed of resilient material and has a predetermined normal set operably directed away from the stationary contact member, includes a portion 19a overlying the contact portion 18a of the movable contact member and forming the sole operating connection therewith for holding the movable contact member out of engagement with the stationary contact member, in open circuit position.

The operator 12, of the instrumentality, or switch as herein described, is slidably mounted in the frame 14 of housing 13 and has an enlarged inner end 12a for limiting its outward movement relative to the housing. The operator is operably engageable, through its enlarged inner end, with the restraining member 19 and is normally biased thereby to a predetermined inoperative position. The operator, which is movable through a predetermined distance from its inoperative position, when actuated moves the restraining member 19 from its normal set toward the stationary contact member so that the movable contact member is enabled to engage the stationary contact member in closed circuit position.

According to the concepts on which the switch is based, the controlled operation or movement of the restraining member by the operator is necessary to assure that the restraining member 19 disengages the movable contact member 18 when the contacts are in closed circuit position, thereby freeing the contacts of any vibration or electrical noise which might be imparted to them by the restraining member, operator or whatever means actuate the operator.

While conventional electrical and mechanical actuating devices for actuating the operator of the switch instrumentality create no particular problems of vibration, which cannot be adequately eliminated by the switch construction itself, it has been found that when the operator is actuated manually, by a push button or the like, the erratic or irregular nature of such operation occasionally produces undesirable vibrations, as a result of the contacts being opened and closed in an uncontrolled manner. The actuator 10, embodying the present invention, overcomes this problem by physically segregating the operator actuating portion of the device from the portion thereof which operates the actuator.

As illustrated, the actuator 10 includes a frame 20 having a switch mounting block 21 and brackets 22, the latter to facilitate mounting the assembly of switch and actuator in a desired manner on a piece of equipment or the like. The switch is rigidly mounted, in any manner known to the art, on the mounting block 21 so that its contacts 17 and 18 are accessible for the connection of lead wires thereto and its operator 12 is directed toward the base 23 of the actuator frame.

The frame 20 mounts the separate operable elements of the actuator, namely, the operator actuating portion 24 and the control portion 25, the portions 24 and 25, which in the illustrated embodiment of the invention comprise levers, being pivotally connected to the upstanding back portion 26 of the frame through a pivot pin 27 carried thereby. The pivot pin, which may take any desired form, is here shown as a U-shaped member wherein the base 27a of the U provides the mount for the pivoted levers and has its longitudinal axis extending substantially transverse to the path of movement of the switch operator 12. The pivot pin is mounted on the back portion 26 of the frame through its arms 27b which are received and frictionally, or otherwise retained in openings 28 therein.

The operator actuating lever 24 which is, as aforesaid, pivotally carried by pivot pin 27 is movable in a path toward and away from switch operator 12 and is engageable therewith. Conveniently, the lever 24 is cut away, as at 29, for a purpose to be hereinafter explained, and it is with this cutaway portion that the operator is in engagement. The operator actuating lever is normally biased by a spring 30, which bears against the lever and the base 23 of the frame and is received in recesses 31 and 32 formed therein, respectively, in the direction of the switch operator 12 for moving the operator from its predetermined position through its predetermined distance, whereby the switch is operated.

The control portion 25, which is movable relative to the portion 24 through a path corresponding thereto, in the illustrated embodiment of the invention comprises a yoke having spaced arms 33 adapted to straddle the lever 24 and through which connection is made to the pivot pin. The arms 33 and the portion 34 intermediate thereof define the space into which the lever 24 extends, the space being shorter than the overall length of the lever. As will be seen, the cutaway portion of the lever 24 extends under intermediate portion 34 of lever 25 into a recess 35, formed therein so that in effect the lever 25 overlies the lever 24. The lever 25 is normally resiliently biased by a spring 36, which bears against one lever arm 33 and the switch mounting block 21 and is received in recesses 37 and 38 formed therein, respectively, in a direction away from the switch operator 12, the spring 36 exerting a force against the lever 25 sufficient, at least in cooperation with the biasing force of the restraining member 19 against the operator, to hold the lever 24 against its spring 32 so that the operator is not moved.

In the illustrated form of the invention the control lever 25 is provided with an integral depending portion 39, having fingers 40, which is adapted to be engaged by objects passing thereunder for moving the lever against its normal bias, thus operating the actuator which in turn actuates the operator of the instrumentality or switch. It will be readily understood, of course, that other means, including a push button or the like, might be utilized for shifting the lever 25 against its normal bias.

In the operation of the actuator 10, according to the invention and as herein described, the operator 12 of the instrumentality 11 is moved from its normal predetermined position through its predetermined operating distance when a force is applied to the control portion 25 of the actuator for moving the latter against its normal bias in the direction of the operator. The movement of the control portion enables the operator actuating portion 24 to move, under the urging of its own biasing means, against the operator 12, thus moving the operator as desired. When the operator has completed its movement, the continued movement of control portion 25, relative to portion 24, releases the latter, thereby separating the elements of the actuator and eliminating the possibility of transmission of erratic actuating vibration to the instrumentality.

While the actuator has been herein described in connection with an electrical switch instrumentality, it will be readily apparent that its applications are numerous and that variations may be made in its construction without departing from the inventive concepts as defined in the claims.

I claim:

1. An actuator for an instrumentality having an operator movable through a predetermined distance and normally urged to a predetermined position, said actuator comprising a first member engageable with said operator and normally urged theretoward for moving said operator from said predetermined position through said predetermined distance, a second member physically independent of and separate from said first member and movable relative to said first member, said second member having a portion releasably engageable with said first member and being normally urged to a predetermined position away from said operator so that said portion engages said first member to prevent the latter from moving said operator, and means for moving said second member from its normal position so that said first member is enabled to move said operator through said predetermined distance, said portion of said second member disengaging said first member after said operator has completed movement through said predetermined distance, whereby shock and vibration imparted to said second member by said means for moving the same are not transmitted to said first member and subsequently to said operator.

2. An actuator for an instrumentality having an operator movable through a predetermined distance and normally urged to a predetermined position, said actuator comprising a first member engageable with said operator and normally resiliently biased theretoward for moving said operator from said predetermined position through said predetermined distance, a second member physically independent of and separate from said first member and being movable relative to said first member and operably disposed at the side thereof directed away from said operator, said second member including a portion overlying said first member and being normally resiliently biased away from said operator under a force sufficient to enable said overlying portion to hold said first member against its normal bias so that said operator is not moved from its predetermined position, and means for moving said second member against its normal bias toward said operator so that said first member is enabled to move said operator through said predetermined distance, said overlying portion disengaging said first member when said operator has completed its predetermined movement, whereby shock and vibration imparted to said second member by said means for moving the same are not transmitted to said first member and subsequently to said operator.

3. An actuator for an instrumentality having an operator movable through a predetermined distance and normally urged to a predetermined position, said actuator comprising a first member pivotally mounted for operable movement toward and away from said operator and being in engagement with said operator and resiliently biased theretoward for moving the latter from said predetermined position through said predetermined distance, a second member physically independent of and separate from said first member and being pivotally mounted for operable movement toward and away from said operator, said second member having a portion releasably engaging said first member and being resiliently biased away from said operator by a force sufficient to overcome the resilient bias of said first member so that said portion holds said first member against moving said operator, and means for moving said second member against its resilient bias so that said first member is enabled to move said operator through said predetermined distance, said portion of said second member disengaging said first member when said operator has completed its movement, whereby shock and vibration imparted to said second member by said means for moving the same are not transmitted to said first member and subsequently to said operator.

4. An actuator for an instrumentality having an operator slidably movable through a predetermined linear distance and normally urged to a predetermined position, said actuator comprising a first lever member pivotally mounted for movement around a given point toward and away from said operator, said lever member being in engagement with said operator and resiliently biased theretoward for moving said operator from said predetermined position through predetermined linear distance, a second lever member physically independent of and separate from said first lever member and being pivotally mounted for movement around said given point, said second lever member having a portion releasably engaging said first lever member and forming the sole operating connection therewith and being resiliently biased away from said operator by a force sufficient to overcome the resilient bias of said first lever member so that said portion holds said first lever member against moving said operator, and means for moving said second lever member against its resilient bias so that said first lever member is enabled to move said operator through said predetermined linear distance, said portion of said second lever member disengaging said first lever member on completion of movement of said operator, whereby shock and vibration imparted to said second lever member by said means for moving the same are not transmitted to said first lever member and subsequently to said operator.

5. An actuator for an instrumentality having a reciprocable operator movable through a predetermined linear distance and normally urged to a predetermined position, said actuator comprising a frame rigidly connected to said instrumentality, a first lever member pivotally connected to said frame and movable through a predetermined path toward and away from said operator, said first lever member operably engaging said opeartor and being normally resiliently biased theretoward under a force sufficient to overcome the normal urging of said operator and move the same from said predetermined position through said predetermined linear distance, a second lever member physically independent of and separate from said first lever member pivotally connected to said frame and movable through a predetermined path toward and away from said operator, said second lever member having a portion releasably engaging said first lever member and being normally resiliently biased away from said operator under a force sufficient to at least supplement the force normally urging the operator to said predetermined position so that said first lever member is held against its normal bias and prevented from moving said operator, and means for moving said second lever member against its normal bias through said predetermined path so that said first lever member is enabled to overcome the normal urging of said operator and move the same, said second lever member releasing its engagement with said first lever member when said operator has completed its movement, whereby shock and vibration imparted to said second lever member by said means for moving the same are not transmitted to said first lever member and subsequently to said operator.

6. An actuator for an instrumentality having a reciprocable operator movable through a predetermined linear distance and normally resiliently biased to a predetermined position, said actuator comprising a frame rigidly mounting said instrumentality, a first lever member pivotally connected to said frame for movement in a predetermined path toward and away from said operator, said first lever member operably engaging said operator and being normally resiliently biased theretoward for moving said operator from said predetermined position through said predetermined linear distance, a second lever member physically independent of and separate from said first lever member pivotally connected to said frame for movement in a path substantially corresponding to the path of movement of said first lever member and including a portion overlying said first lever member at the side thereof directed toward said operator and forming the sole operating connection therewith, said second lever member being normally resiliently biased away from said operator by a force cooperative with the force biasing said operator into said predetermined position for holding said first lever member against its normal bias so that said operator is not moved, and means for moving said second lever member against its normal bias so that said first lever member is enabled to move said operator, said overlying portion disengaging said first lever member when said operator has moved said predetermined distance, whereby shock and vibration imparted to said second lever member by said means for moving the same are not transmitted to said first lever member and subsequently to said operator.

7. An actuator for an instrumentality having a reciprocable operator movable through a predetermined distance and normally urged to a predetermined position, said actuator comprising a frame rigidly mounting said instrumentality, a pivot pin connected to said frame and having its operable axis extending substantially transverse to the path of movement of said operator, a first lever member carried by said pin for pivotal movement in a path toward and away from said operator, said first lever member being in engagement with said operator and normally being resiliently biased theretoward for moving said operator from the position to which it is normally urged through said predetermined distance, a second lever member physically independent of and separate from said first lever member carried by said pin for pivotal movement in a path corresponding to the movement of said first lever member and having a portion disengageably overlying a surface of said first lever member directed toward said operator and forming the sole connection therewith, said second lever member being resiliently biased away from said operator by a force sufficient to hold said first lever member against its normal bias so that movement of said operator is prevented, and means for imparting movement to said second lever member in the direction of said operator so that said first lever member is enabled to move said operator, said overlying portion of said second lever member disengaging said first lever member when said operator has moved said predetermined distance, whereby shock and vibration imparted to said second lever member by said means for moving the same are not transmitted to said first lever member and subsequently to said operator.

8. In combination with an electrical switch including a stationary contact and a movable contact, the latter being resiliently biased toward the former into closed circuit position therewith and being disengageably held in open circuit position by a separate restraining means resiliently biased away from said stationary contact, said restraining means having a portion overlying said movable contact and forming the sole operating connection therewith, and an operator operably connected to said restraining means and movable through a predetermined distance for imparting movement to said restraining means in the direction of said stationary contact to enable said movable contact to engage said stationary contact in closed circuit position and the overlying portion of the restraining means to disengage the movable contact, said operator being normally urged to a predetermined inoperative position by said restraining means; an actuator for said operator, said actuator comprising a first member engageable with said operator and normally urged theretoward for moving said operator from said predetermined position through said predetermined distance, a second member movable relative to said first member and having a portion releasably engageable therewith, said second member being normally urged to a predetermined position away from said operator so that said portion of said second member engages said first member to prevent the latter from moving said operator and means for moving said second member from its normal position so that said first member is enabled to move said operator through said predetermined distance, said portion of said second member disengaging said first member after said operator has completed movement through said predetermined distance.

9. In combination with an electrical switch including a stationary contact and a movable contact, the latter being resiliently biased toward the former into closed circuit position therewith and being disengageably held in open circuit position by a separate restraining means resiliently biased away from said stationary contact, said restraining means having a portion overlying said movable contact and forming the sole operating connection therewith, and an operator operably connected to said restraining means and movable through a predetermined distance for imparting movement to said restraining means in the direction of said stationary contact to enable said movable contact to engage said stationary contact in closed circuit position and the overlying portion of the restraining means to disengage the movable contact, said operator being normally urged to a predetermined inoperative position by said restraining means; an actuator for said operator, said actuator comprising a first lever member operably in engagement with said operator and normally urged theretoward for moving said operator from said predetermined position through said predetermined distance against the urging of said restraining means, a second lever member movable relative to said first lever member and having a portion releasably engageable with said first lever member and forming the sole operating connection therewith, said second lever member being normally urged to a predetermined position away from said operator by a force sufficient in cooperation with the urging of said restraining means so that said portion of said second lever member engages said first lever member and holds the latter against moving said operator and means for moving said second lever member from its normal position so that said first lever member is enabled to move said operator through said predetermined distance, said portion of said second lever member disengaging said first lever member after said operator has completed movement through said predetermined distance.

10. In combination with an electrical switch including a switch housing, a stationary contact and a movable contact disposed within said housing, the movable contact being resiliently biased toward the stationary contact into closed circuit position therewith and being disengageably held in open circuit position by a separate restraining means disposed within said housing adjacent the side of said movable contact directed away from said stationary contact, said restraining means being resiliently biased away from said stationary contact and having a portion overlying said movable contact and forming the sole operating connection therewith, and an operator reciprocably carried by said housing and operably connected to said restraining means, said operator being movable through a predetermined distance for imparting movement to said restraining means in the direction of said stationary contact to enable said movable contact to engage said stationary contact in closed circuit position and the overlying portion of the restraining means to disengage the movable contact and being normally urged to a predetermined inoperative position by said restraining means; an actuator for said operator, said actuator comprising a frame rigidly connected to said switch housing, a first lever member pivotally carried by said frame for movement in a predetermined path toward and away from said operator, said first lever member being engageable with said operator and normally resiliently biased theretoward for moving said operator from said predetermined position through said predetermined distance, a second lever member pivotally connected to said frame and movable relative to said first lever member and said frame in a predetermined path toward and away from said operator and having a portion operably between said first lever member and said operator that is releasably engageable with said first lever member, said second lever member being normally resiliently biased to a predetermined position away from said operator so that said portion of said second lever member engages said first lever member to prevent the latter from moving said operator and means for moving said second lever member from its normal position so that said first lever member is enabled to move said operator through said predetermined distance, said portion of said second lever member disengaging said first lever member after said operator has completed movement through said predetermined distance.

References Cited by the Examiner

UNITED STATES PATENTS 2,432,899  12/1947  Immel.

ROBERT K. SCHAEFER, *Primary Examiner.*

KATHLEEN H. CLAFFY, *Examiner.*

H. HOHAUSER, *Assistant Examiner.*